(12) United States Patent
Vick

(10) Patent No.: US 9,963,060 B1
(45) Date of Patent: May 8, 2018

(54) VEHICLE RUNNING BOARD ASSEMBLY FOR USE AS A RAMP

(71) Applicant: David A. Vick, Cottage Grove, MN (US)

(72) Inventor: David A. Vick, Cottage Grove, MN (US)

( * ) Notice: Subject to any disclaimer, the term of this patent is extended or adjusted under 35 U.S.C. 154(b) by 0 days. days.

(21) Appl. No.: 15/790,098

(22) Filed: Oct. 23, 2017

(51) Int. Cl.
*B60P 1/43* (2006.01)
*B65G 69/30* (2006.01)
*B60R 3/00* (2006.01)

(52) U.S. Cl.
CPC .............. *B60P 1/435* (2013.01); *B60R 3/002* (2013.01); *B60R 3/007* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,637,518 B2* | 12/2009 | Adair | ..................... | B65G 69/30 280/163 |
| 7,708,294 B2* | 5/2010 | Demick | .................... | B60P 1/43 280/163 |
| 9,682,657 B1* | 6/2017 | Baskin | ..................... | B60R 3/002 |
| 2002/0163157 A1* | 11/2002 | Beck | ...................... | B60R 3/002 280/164.1 |
| 2002/0195792 A1* | 12/2002 | Hendrix | .................. | B60R 3/002 280/164.1 |
| 2009/0044729 A1* | 2/2009 | Navarre | .................... | B60P 1/43 108/44 |
| 2015/0175079 A1* | 6/2015 | Kmita | ..................... | B60R 3/007 280/166 |
| 2016/0185273 A1* | 6/2016 | Aftanas | .................. | B65G 69/30 280/164.1 |

* cited by examiner

*Primary Examiner* — Bryan A Evans
(74) *Attorney, Agent, or Firm* — Dave Alan Lingbeck

(57) ABSTRACT

A vehicle running board assembly for use as a ramp for quickly detaching the running board for use as a ramp and then quickly re-attaching the running board to the vehicle to be used as a running board. The vehicle running board assembly for use as a ramp includes a running board adapted to be removably mounted to a side of a vehicle; and a support assembly adapted to be secured to a frame of the vehicle and upon which the running board is mounted.

16 Claims, 4 Drawing Sheets

VEHICLE RUNNING BOARD ASSEMBLY FOR USE AS A RAMP

BACKGROUND OF THE INVENTION

Field of the Invention

The present invention relates to vehicle running boards and more particularly pertains to a new vehicle running board assembly for use as a ramp for quickly detaching the running board for use as a ramp and then quickly re-attaching the running board to the vehicle to be used as a running board.

Description of the Prior Art

The use of vehicle running boards is known in the prior art. More specifically, vehicle running boards heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a front and rear mounting bracket each secured to a lower central side portion of the vehicle; an elongate runner releasably engaging, and carried by the front and rear mounting brackets; and, releasable lock means to releasably lock the elongate runner board on the brackets. Another prior art includes a first structure including a first surface and a first interlocking joint; a second structure including a second surface and a second interlocking joint to receive the first interlocking joint; and a linkage that connects the first structure and the second structure and articulates the apparatus from a closed position to an open position. In the closed position, the first surface and the second surface are vertically stacked and in the open position the first structure and the second structure are interlocked through the first interlocking joint and the second interlocking joint and the first surface and the second surface are horizontally adjacent. While these devices fulfill their respective, particular objectives and requirements, the aforementioned patents do not disclose a new vehicle running board assembly for use as a ramp.

SUMMARY OF THE INVENTION

The general purpose of the present invention, which will be described subsequently in greater detail, is to provide a new vehicle running board assembly for use as a ramp which has many of the advantages of the vehicle running boards mentioned heretofore and many novel features that result in a new vehicle running board assembly for use as a ramp which is not anticipated, rendered obvious, suggested, or even implied by any of the prior art vehicle running boards, either alone or in any combination thereof. The present invention includes a running board adapted to be removably mounted to a side of a vehicle; and a support assembly adapted to be secured to a frame of the vehicle and upon which the running board is mounted. None of the prior art includes the combination of the elements of the present invention.

There has thus been outlined, rather broadly, the more important features of the vehicle running board assembly for use as a ramp in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new vehicle running board assembly for use as a ramp which has many of the advantages of the vehicle running boards mentioned heretofore and many novel features that result in a new vehicle running board assembly for use as a ramp which is not anticipated, rendered obvious, suggested, or even implied by any of the prior art vehicle running boards, either alone or in any combination thereof.

Still another object of the present invention is to provide a new vehicle running board assembly for use as a ramp for quickly detaching the running board for use as a ramp and then quickly re-attaching the running board to the vehicle to be used as a running board.

Still yet another object of the present invention is to provide a new vehicle running board assembly for use as a ramp that can be quickly mounted as a running board and dismounted without needing any tools.

Even still another object of the present invention is to provide a new vehicle running board assembly for use as a ramp that effectively eliminates the need to have separate running boards and ramps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
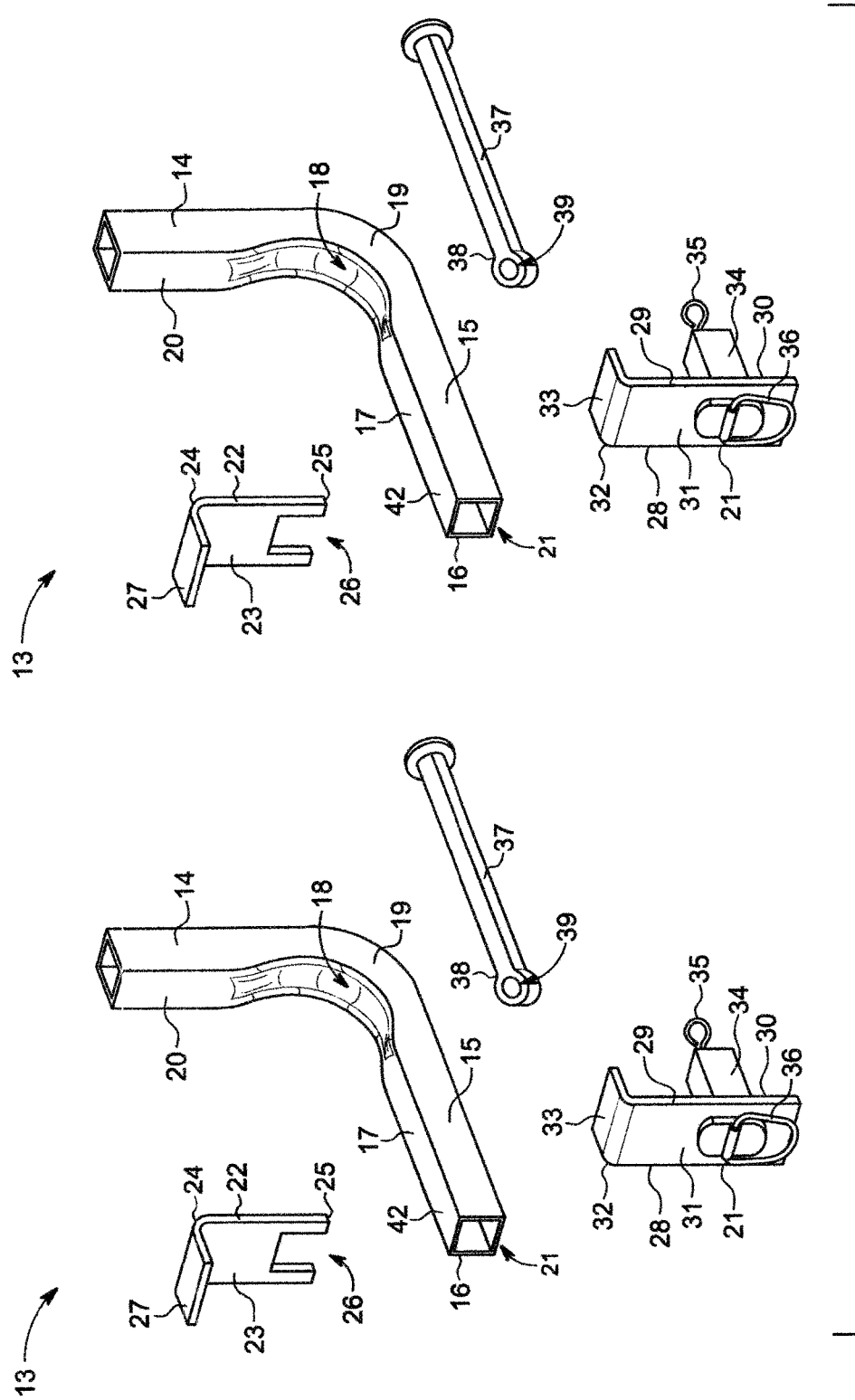
FIG. 1 is an exploded perspective view of the support assembly according to the present invention.
Figure 2:
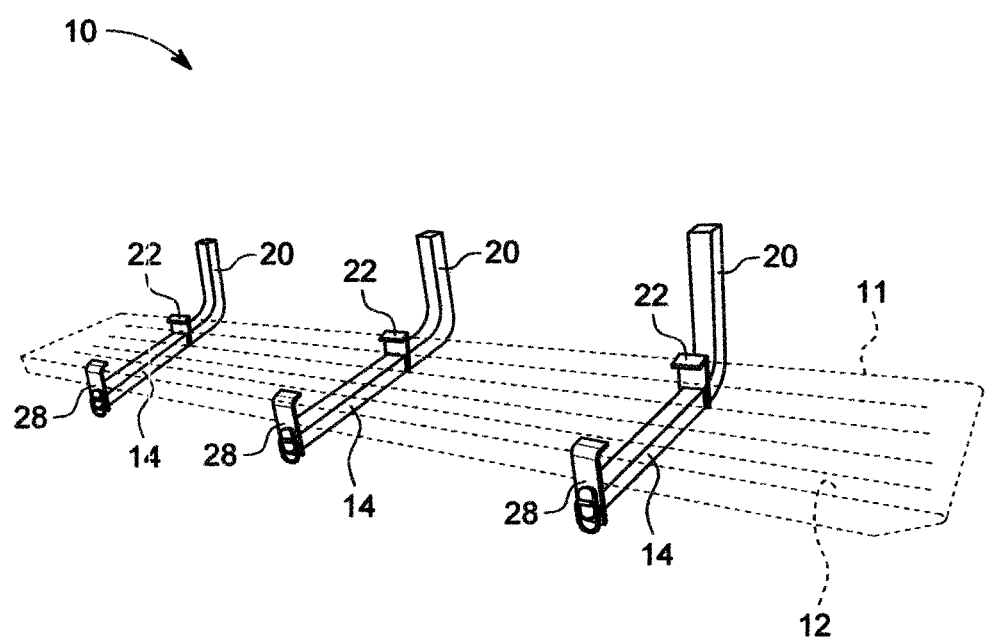
FIG. 2 is a top perspective view of the running board ramp assembly according to the present invention.
Figure 3:
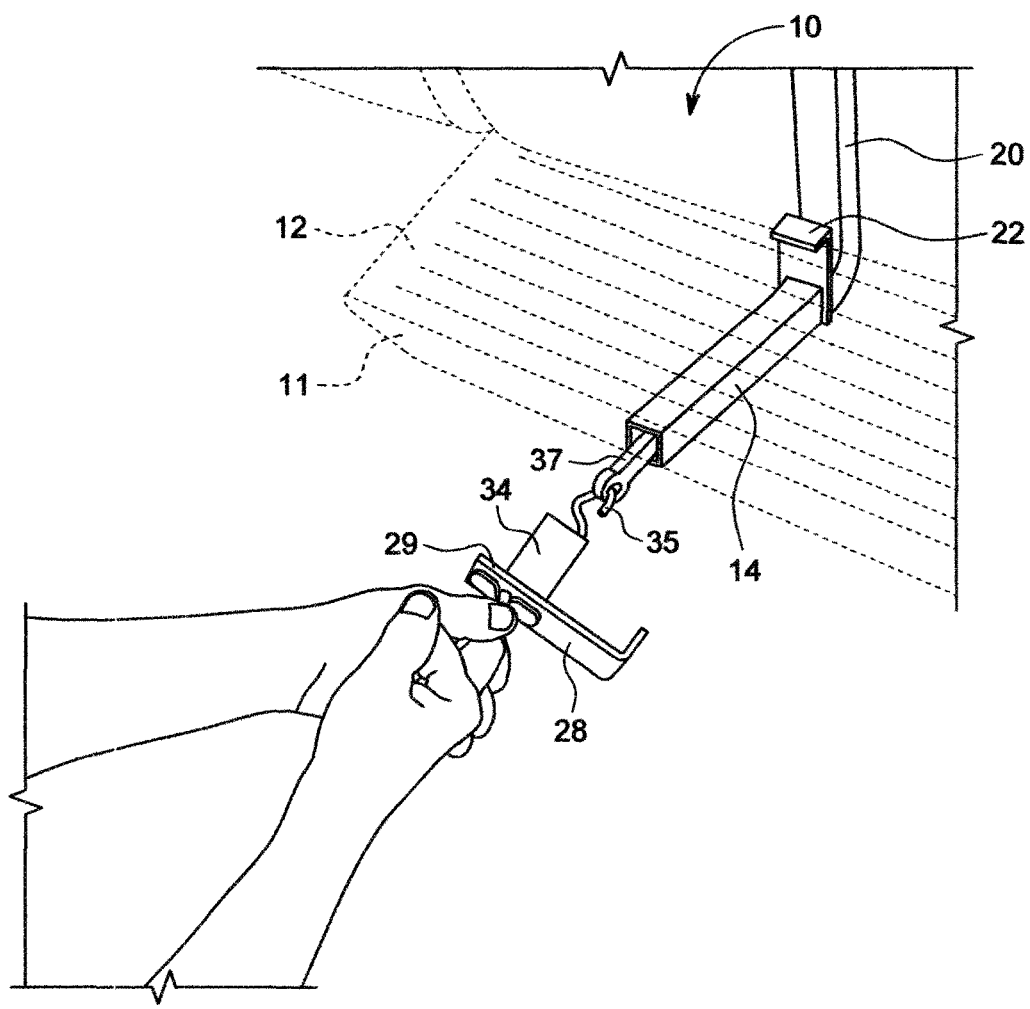
FIG. 3 is a perspective view of a partial running board with the bungee cord and clip pulled out of one of the support members according to the present invention.
Figure 4:
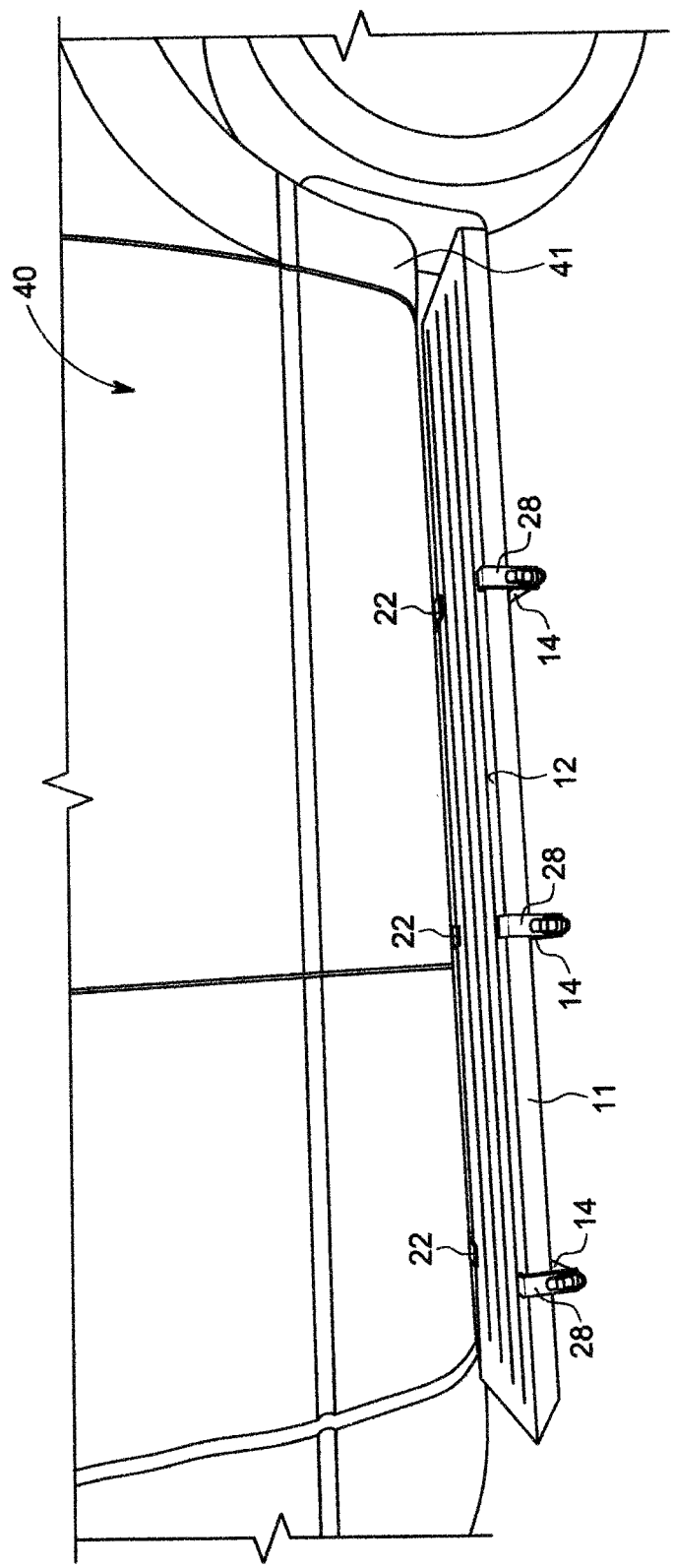
FIG. 4 is an end perspective view of the running board ramp assembly mounted to the vehicle according to the present invention.

With reference now to the drawings, and in particular to FIGS. 1 through 4 thereof, a new vehicle running board assembly for use as a ramp embodying the principles and concepts of the present invention and generally designated by the reference numeral 10 will be described.

As best illustrated in FIGS. 1 through 4, the vehicle running board assembly for use as a ramp 10 generally comprises a running board 11 adapted to be removably mounted to a side of a vehicle 40; and a support assembly 13 adapted to be secured to a frame 41 of the vehicle 40 and upon which the running board 11 is mounted.

The support assembly 13 includes elongated support members 14 adapted to be fixedly attached to the frame 41 of the vehicle 40. Each of the support members 14 has, a main portion 15 and an end portion 20 integrally attached to and angled relative to the main portion 15. The main portion 15 of each of the support members 14 is tubular and has a wall 42, an open end 16 and a bore 21 disposed therein. The running board 11 is removably mounted upon the main portion 15 of each of the support members 14. Each of the support members 14 has an opening 18 disposed through the wall 42 and into the bore 21 at a junction 19 of the main portion 15 and the end portion 20. The end portion 20 of each of the support members 14 is angled approximately 90 degrees to a respective main portion 15. The end portion 20 of each of the support members 14 is adapted to securely and conventionally fasten to the frame 41 of the vehicle 40.

The support assembly 13 also includes brackets 22 each securely and conventionally attached and welded to a respective support member 14. Each of the brackets 22 includes a planar main portion 23 having a bottom end 25 and a top end 24 and also includes a planar end portion 27 integrally extending from the top end 24 and angled relative to the main portion 23. The main portion 23 of each of the brackets 22 has a slot 26 disposed in the bottom end 25 and is securely and conventionally mounted upon a top 17 of the main portion 15 proximate to the end portion 20 of a respective support member 14. Each of the support members 14 is securely received in the slot 26 of a respective bracket 22. The main portion 23 of each of the brackets 22 extend upwardly perpendicular to the main portion 15 of a respective support member 14 with the end portion 27 of each of the brackets 22 spaced from and extending parallel and towards the open end 16 of the main portion 15 of a respective support member 14.

The support assembly 13 further includes clamps 28 biasedly engaged in the open ends 16 of the support members 14. Each of the clamps 28 includes a planar main portion 29 having a front side 30, a back side 31 and an outer end 32 and also includes a planar end portion 33 integrally attached to and extending from the outer end 32 and angled relative to the main portion 29 of a respective clamp 28. Each of the clamps 28 also includes a boss 34 integrally attached to End'extending, outwardly from the back side 31 of the main portion 29 of a respective clamp 28 and which is removably and biasedly seated and engaged in the open end 16 of a respective support member 14. Each of the clamps 28 further includes a connector 35 conventionally extending in and from the boss 34 of a respective clamp 28 and also includes a handle 36 conventionally attached to the front side 30 of the main portion 29 of a respective clamp 28. The end portion 33 of each of the clamps 28 is spaced from and extending parallel to the main portion 15 of a respective support member 14 and extending towards a respective bracket 22 when the boss 334 is biasedly seated in the open end 16 of a respective support member 14.

The support assembly 13 also includes elongated biased elements 37, 43 each securely and conventionally disposed in the bore 21 of a respective support member 14 and conventionally connected to a respective clamp 28 to biasedly engage the respective clamp 28 with the respective support member 14. The biased elements 37, 43 are elastic cords 37 each having an end 38 which terminates into an eyelet 39. The connector 35 of each of the brackets 22 is removably received in the eyelet 39 of a respective elastic cord 37, 43. The connector 35 of each of the brackets 22 is an S-shaped hook which is removably extended through the eyelet 39 of a respective elastic cord 37. The running board 11 is removably secured upon the support members 14 and engaged between the brackets 22 and the clamps 28. The end portions 27 of the brackets 22 and the clamps 28 engage a top 12 of the running board 11 when the running board 11 is mounted upon the support members 14 to secure the running board 11 to the support members 14.

In use, the user secures the running board 11 to the side of the vehicle 40 by pulling on the handles 36 of the clamps 28 and removing the clamps 28 from engagement with the support members 14 and positioning the running board upon the support members and then releasing the clamps 28 with the clamps 28 engaging the support members 14 and the running board 11 which is tightly engaged between the brackets 22 and the clamps 28. To remove the running board 11 for use as a ramp, the user pulls on the clamps 28 to disengage the clamps 28 from the support members 14 and lifts the running board 11 off the support members 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the vehicle running board assembly for use as a ramp. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle running board assembly for use as a ramp comprising:
   a running board adapted to be removably mounted to a side of a vehicle; and
   a support assembly adapted to be secured to a frame of the vehicle and upon which the running board is mounted, wherein the support assembly includes elongated support members adapted to be fixedly attached to the frame of the vehicle; wherein each of the support members has a main portion and an end portion integral to and angled relative to the main portion, wherein the main portion of each of the support members is tubular and has a wall, an open end and a bore disposed therein, wherein the running board is removably mounted upon the main portion of each of the support members, wherein each of the support members has an opening disposed through the wall and into the bore at a junction of the main portion and the end portion.

2. The vehicle running board assembly for use as a ramp as described in claim 1, wherein the end portion of each of the support members is angled approximately 90 degrees to a respective said main portion; wherein the end portion of each of the support members is adapted to securely fasten to the frame of the vehicle.

3. The vehicle running board assembly for use as a ramp as described in claim 2, wherein the support assembly also includes brackets each securely attached to a respective said support member.

4. The vehicle running board assembly for use as a ramp as described in claim 3, wherein each of the brackets includes a planar main portion having a bottom end and a top end and also includes a planar end portion extending from the top end and angled relative to the main portion.

5. The vehicle running board assembly for use as a ramp as described in claim 4, wherein the main portion of each of the brackets has a slot disposed in the bottom end and is securely mounted upon a top of the main portion proximate to the end portion of a respective said support member.

6. The vehicle running board assembly for use as a ramp as described in claim 5, wherein each of the support members is securely received in the slot of a respective said bracket.

7. The vehicle running board assembly for use as a ramp as described in claim 4, wherein the main portion of each of the brackets extend upwardly perpendicular to the main portion of a respective said support member with the end portion of each of the brackets spaced from and extending parallel and towards the open end of the main portion of a respective said support member.

8. A vehicle running board assembly for use as a ramp comprising:
a running board adapted to be removably mounted to a side of a vehicle; and
a support assembly adapted to be secured to a frame of the vehicle and upon which the running board is mounted, wherein the support assembly includes elongated support members adapted to be fixedly attached to the frame of the vehicle; wherein each of the support members has a main portion and an end portion integral to and angled relative to the main portion, wherein the main portion of each of the support members is tubular and has a wall, an open end and a bore disposed therein, wherein the running board is removably mounted upon the main portion of each of the support members, wherein the support assembly further includes clamps biasedly engaged in the open ends of the support members, wherein each of the clamps includes a planar main portion having a front side, a back side and an outer end and also includes a planar end portion extending from the outer end and angled relative to main portion.

9. The vehicle running board assembly for use as a ramp as described in claim 8, wherein each of the clamps also includes a boss extending outwardly from the back side of the main portion and which is removably and biasedly seated and engaged in the open end of a respective said support member.

10. The vehicle running board assembly for use as a ramp as described in claim 9, wherein each of the clamps further includes a connector extending in and from the boss and also includes a handle attached to the front side of the main portion.

11. The vehicle running board assembly for use as a ramp as described in claim 8, wherein the end portion is spaced from and extending parallel of the main portion of a respective said support member and extending towards a respective said bracket when the boss is biasedly seated in the open of a respective said support member.

12. The vehicle running board assembly for use as a ramp as described in claim 4, wherein the support assembly also includes elongated biased elements each securely disposed in the bore of a respective said support member and connected to a respective said clamp to biasedly engage the respective said clamp with the respective said support member.

13. The vehicle running board assembly for use as a ramp as described in claim 12, wherein the biased elements are elastic cords each having an end which terminates into an eyelet, wherein the connector of each of the brackets is removably received in the eyelet of a respective said elastic cord.

14. The vehicle running board assembly for use as a ramp as described in claim 13, wherein the connector of each of the brackets is an S-shaped hook which is removably extended through the eyelet of a respective said elastic cord.

15. The vehicle running board assembly for use as a ramp as described in claim 8, wherein the running board is removably secured upon the support members and engaged between the brackets and the clamps.

16. The vehicle running board assembly for use as a ramp as described in claim 8, wherein the end portions of the brackets and the clamps engage a top of the running, board when the running board is mounted upon the support members to secure the running board to the support members.

* * * * *